US011952913B2

(12) United States Patent
Rao et al.

(10) Patent No.: US 11,952,913 B2
(45) Date of Patent: Apr. 9, 2024

(54) TURBINE BLADE WITH IMPROVED SWIRL COOLING PERFORMANCE AT LEADING EDGE AND ENGINE

(71) Applicant: Shanghai Jiaotong University, Shanghai (CN)

(72) Inventors: Yu Rao, Shanghai (CN); Yong Luan, Shanghai (CN); Yamin Xu, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 0 days.

(21) Appl. No.: 18/304,387

(22) Filed: Apr. 21, 2023

(65) Prior Publication Data

US 2024/0076990 A1 Mar. 7, 2024

(30) Foreign Application Priority Data

Apr. 27, 2022 (CN) ......................... 202210452888.7

(51) Int. Cl.
*F01D 5/18* (2006.01)

(52) U.S. Cl.
CPC ........ *F01D 5/187* (2013.01); *F05D 2240/303* (2013.01); *F05D 2260/202* (2013.01); *F05D 2260/2214* (2013.01)

(58) Field of Classification Search
CPC ............... F01D 5/187; F05D 2240/303; F05D 2260/202; F05D 2260/2214
See application file for complete search history.

(56) References Cited

U.S. PATENT DOCUMENTS

| | | | | |
|---|---|---|---|---|
| 10,830,049 | B2 * | 11/2020 | Clum | F01D 5/20 |
| 2007/0297916 | A1 * | 12/2007 | Levine | F01D 5/187 416/96 R |
| 2016/0090847 | A1 * | 3/2016 | Shchukin | F01D 5/187 416/96 R |
| 2018/0320525 | A1 * | 11/2018 | Clum | B22C 9/103 |

FOREIGN PATENT DOCUMENTS

CN 209761501 U 12/2019

* cited by examiner

*Primary Examiner* — Eldon T Brockman

(57) ABSTRACT

A turbine blade includes a blade body, a division plate, a plurality of first protruding ridges, a plurality of second protruding ridges, a first jet hole group, and a second jet hole group. The blade body includes a suction-side wall surface and a pressure-side wall surface, which are provided with multiple film cooling holes. The stagnation region at the leading edge of the blade body is provided with multiple film cooling holes. The first and second jet hole groups are provided on the division plate. The first protruding ridges are provided on a suction-side inner wall surface, and the second ridges are provided on a pressure-side inner wall surface. An engine including the turbine blade is further provided.

10 Claims, 4 Drawing Sheets

TURBINE BLADE WITH IMPROVED SWIRL COOLING PERFORMANCE AT LEADING EDGE AND ENGINE

CROSS-REFERENCE TO RELATED APPLICATIONS

This application claims the benefit of priority from Chinese Patent Application No. 202210452888.7, filed on Apr. 27, 2022. The content of the aforementioned application, including any intervening amendments thereto, is incorporated herein by reference in its entirety.

TECHNICAL FIELD

This application relates to turbines, and more particularly to a turbine blade with improved swirl cooling performance at a leading edge and an engine.

BACKGROUND

Increasing the inlet air temperature is recognized as an important way to improve the thermal efficiency of gas turbines and aero engines. Currently, the turbine inlet temperature is much higher than the operating temperature limit of the metal materials used for the turbine blade, so the turbine blades need to be cooled to keep the blade wall temperature within a tolerable range.

Chinese patent No. 209761501U discloses a turbine blade shroud and a turbine blade for an aero-engine, where the blade shroud has a significantly-reduced weight while ensuring the thickness and performance thereof, thereby reducing the centrifugal load of the turbine blade in the working state. The turbine blade shroud of the aero-engine is provided with a cavity inside, which is filled with a supporting structure. The turbine blade is provided with such blade shroud. Though this design can improve the operation state of the turbine blade to some extent, it fails to take the heat dissipation of the turbine blades into consideration.

Conventionally, the leading edge of the turbine blade is cooled by impingement cooling, and film cooling holes are provided on the leading edge wall surface at an inclination angle of 30° to 60°. During the operation of the turbine blade, the leading edge wall surface is subject to the most severe thermal load due to the direct exposure to the high-temperature gas flow impact, and the thermal protection of the leading edge mainly relies on the internal impingement cooling and the film cooling formed by the outflow from the film cooling holes on the leading edge wall surface. Both the internal impingement cooling and the film cooling airflow come from the compressor bleed air, but the compressor bleeding will affect the engine performance, such as reducing the thermal efficiency and output power of the gas turbine. If the cooling performance of the turbine blades is improved, the bleed air from the compressor for cooling can be reduced, and the same cooling effect can also be achieved, thereby improving the overall performance of the gas turbine. Therefore, it is of great significance for the development of gas turbines and aero engines to enhance and optimize the cooling performance of the turbine blade.

However, for the internal impingement cooling of the leading edge, jet holes are centrally arranged in the leading-edge division plate, and the jet directly impacts the wall surface in the stagnation region of the leading edge, which leads to the highest impingement-cooling heat transfer coefficient in the wall exposed to the jet impact. However, there is a large jet pressure loss, and the heat transfer distribution on the wall surface is uneven, such that the heat transfer performance of the area outside the jet impingement region decays sharply. The stagnation region is the part of the leading edge directly subject to the external mainstream impingement, and thus the film cooling holes are densely distributed in the stagnation region, with the inlet distributed on the inner wall surface of the stagnation region. When the internal jet of the leading edge impinges on the inner wall densely distributed with the film cooling holes, a flow stagnation region will be formed at the inlets of the film cooling holes, or a near-wall high-speed transverse jet will be formed after the impingement. Moreover, a backflow vortex is formed at the inlets of the film cooling holes, and the vortex on the wall surface of the stagnation region will block the inlets of the film cooling holes, resulting in a reduced flow rate in the film cooling holes, and further weakening the convective cooling in the film cooling holes and external film cooling. In addition, the blockage will lead to uneven velocity distribution, and thus the local high cooling-jet momentum may occur, deteriorating the film cooling performance at the leading edge. In this case, the leading edge will suffer high-temperature erosion, shortening the service life of the turbine blade. Moreover, the blockage in the film cooling holes will also result in the invasion of the external high-temperature gas into the film cooling holes, causing high-temperature oxidation and thermal damage to the turbine blade body, and shortening the service life of the turbine blade. In addition, the jet impingement and the arrangement of the film cooling holes mainly occur in the stagnation region of the leading edge, and the cooling performance of the suction surface and pressure surface of the leading edge is poor since there is a backflow vortex formed after the jet impingement inside the leading edge, which has a poor convective heat transfer performance.

SUMMARY

In view of the deficiencies in the prior art, this application provides a turbine blade with improved swirl cooling performance at a leading edge and an engine.

In a first aspect, this application provides a turbine blade, including:

a blade body;

a division plate;

a plurality of first protruding ridges;

a plurality of second protruding ridges;

a first jet hole group; and a second jet hole group;

wherein the blade body includes a suction-side wall surface and a pressure-side wall surface;

the suction-side wall surface includes a suction-side inner wall surface and a suction-side outer wall surface;

the pressure-side wall surface includes a pressure-side inner wall surface and a pressure-side outer wall surface;

the division plate is provided at a leading edge of the blade body; the leading edge of the blade body has a cavity enclosed by the division plate, the suction-side wall surface, and the pressure-side wall surface; a stagnation region is formed by a junction between the suction-side wall surface and the pressure-side wall surface; and the stagnation region includes a first stagnation sub-region at the leading edge of the blade body and a second stagnation sub-region at a leading edge of the cavity;

the suction-side wall surface, the pressure-side wall surface, and the first stagnation sub-region are each provided with a plurality of first film cooling holes along a height direction of the blade body; the first jet hole group and the second jet hole group are provided on the division plate; the first jet hole group includes a plurality of first jet holes distributed along the height direction of the blade body; and the second jet hole group includes a plurality of second jet holes distributed along the height direction of the blade body;

the plurality of first protruding ridges are provided on the suction-side inner wall surface along the height direction of the blade body; the plurality of second protruding ridges are provided on the pressure-side inner wall surface along the height direction of the blade body; and the plurality of first protruding ridges and the plurality of second protruding ridges are located on an inner wall surface of the cavity;

the suction-side inner wall surface in the cavity is divided by the plurality of first protruding ridges into a first inner wall surface of the stagnation region and a rear portion of the suction-side inner wall surface; and the pressure-side inner wall surface in the cavity is divided by the plurality of second protruding ridges into a second inner wall surface of the stagnation region and a rear portion of the pressure-side inner wall surface; and the first inner wall surface of the stagnation region and the second inner wall surface of the stagnation region form an inner wall surface of the first stagnation sub-region.

In an embodiment, the plurality of first protruding ridges are arranged spaced apart; the plurality of second protruding ridges are arranged spaced apart; and the plurality of first protruding ridges and the plurality of second protruding ridges are in a staggered arrangement.

In an embodiment, the second stagnation sub-region has an internal concave structure; and the plurality of first protruding ridges and the plurality of second protruding ridges are arranged outside the internal concave structure.

In an embodiment, an axis of each of the plurality of first jet holes is configured to be oriented towards the rear portion of the suction-side inner wall surface; and an axis of each of the plurality of second jet holes is configured to be oriented towards the rear portion of the pressure-side inner wall surface.

In an embodiment, the plurality of first jet holes are arranged spaced apart; the plurality of second jet holes are arranged spaced apart; and the plurality of first j et holes and the plurality of second jet holes are in a staggered arrangement.

In an embodiment, a width of each of the plurality of first protruding ridges and a width of each of the plurality of second protruding ridges are 1.0 to 6.0 times a width of each of the plurality of first jet holes; and a height of each of the plurality of first protruding ridges and a height of each of the plurality of second protruding ridges are 0.1 to 3.0 times a height of each of the plurality of first jet holes.

In an embodiment, along the height direction of the blade body, the plurality of second protruding ridges are provided on a cross section provided with the plurality of second jet holes; and the plurality of first protruding ridges and the plurality of first jet holes are not provided on the cross section provided with the plurality of second jet holes; and along the height direction of the blade body, the plurality of first protruding ridges are provided on a cross section provided with the plurality of first jet holes; and the plurality of second protruding ridges and the plurality of second jet holes are provided on the cross section provided with the plurality of first jet holes.

In an embodiment, a plurality of second film cooling holes are provided on the rear portion of the pressure-side inner wall surface along the height direction of the blade body; a plurality of third film cooling holes are provided on the rear portion of the suction-side inner wall surface along the height direction of the blade body; and the plurality of second film cooling holes and the plurality of third film cooling holes are arranged alternately.

In an embodiment, a distance between two adjacent first jet holes of the plurality of first jet holes is 2 to 6 times a diameter of each of the plurality of first jet holes; and a distance between two adjacent second jet holes of the plurality of second jet holes is 2 to 6 times a diameter of each of the plurality of second jet holes.

In another aspect, this application further provides an engine including the above-mentioned turbine blade.

Compared to the prior art, this application has the following beneficial effects.

1. Regarding the turbine blade provided herein, the oblique or offset jet is employed to form swirling flow and swirl cooling in the leading-edge inner cavity, and in combination of the arrangement of protruding ridges, the flow at the entrance of the film cooling holes is improved, and an improved velocity distribution in the film cooling holes is reached, avoiding the deficiency in the prior art that the vortex will block the entrance of the film cooling holes. Such swirling flow improves the cooling effectiveness of the suction-side and pressure-side inner wall surfaces of the turbine blade leading edge, and arrives at a better flow cooling effect inside the film cooling holes.
2. The axis of the second jet hole is designed to be oriented towards the rear portion of the pressure-side inner wall surface, so that the swirling flow generated on the rear portion of the pressure-side inner wall surface can attach to or impinge on the rear portion of the suction-side inner wall surface (that is, the portion of the suction-side inner wall surface near the division plate), and can flow tangentially against the suction-side inner wall surface, which can enhance the heat transfer of the inner wall of the turbine blade and improve the cooling uniformity of the inner wall.
3. The axis of the first jet hole is designed to be oriented towards the rear portion of the suction-side inner wall surface, so that the swirling flow generated on the rear portion of the suction-side inner wall surface can attach to or impinge on the rear portion of the pressure-side inner wall surface (that is, the portion of the pressure-side inner wall surface near the division plate), and can flow tangentially against the pressure-side inner wall surface, which can enhance the heat transfer of the inner wall of the turbine blade and improve the cooling uniformity of the inner wall.

BRIEF DESCRIPTION OF THE DRAWINGS

The disclosure will be described in detail below with reference to the drawings in the embodiments of the disclosure to make the technical solutions, objects and advantages of the disclosure clearer.

In the figures: 1-suction-side outer wall surface; 2-pressure-side outer wall surface; 3-cavity; 8-first film cooling hole; 9-film outflow; 10-second protruding ridge; 11-pressure-side inner wall surface; 12-first protruding ridge; 13-suction-side inner wall surface; 14-inner wall surface of the first stagnation sub-region; 23-second jet hole; 24-second film cooling hole; 25-third film cooling hole; 30-jet flow; 40-swirling flow; 100-suction-side wall surface; 111-rear portion of the pressure-side inner wall surface; 131-rear portion of suction-side inner wall surface; 161-first stagnation sub-region; 200-pressure-side wall surface; 16-second stagnation sub-region; 20-division plate; and 22-first jet hole.

DETAILED DESCRIPTION OF EMBODIMENTS

The disclosure will be further described in detail below in conjunction with embodiments. It should be noted that these embodiments are merely illustrative to promote the understanding and implementation of the technical solutions of the disclosure, but are not intended to limit the disclosure. It should be understood that any modifications and replacements made by those skilled in the art without departing from the spirit of the disclosure should fall within the scope of the disclosure defined by the present claims.

Embodiment 1

Figure 1:
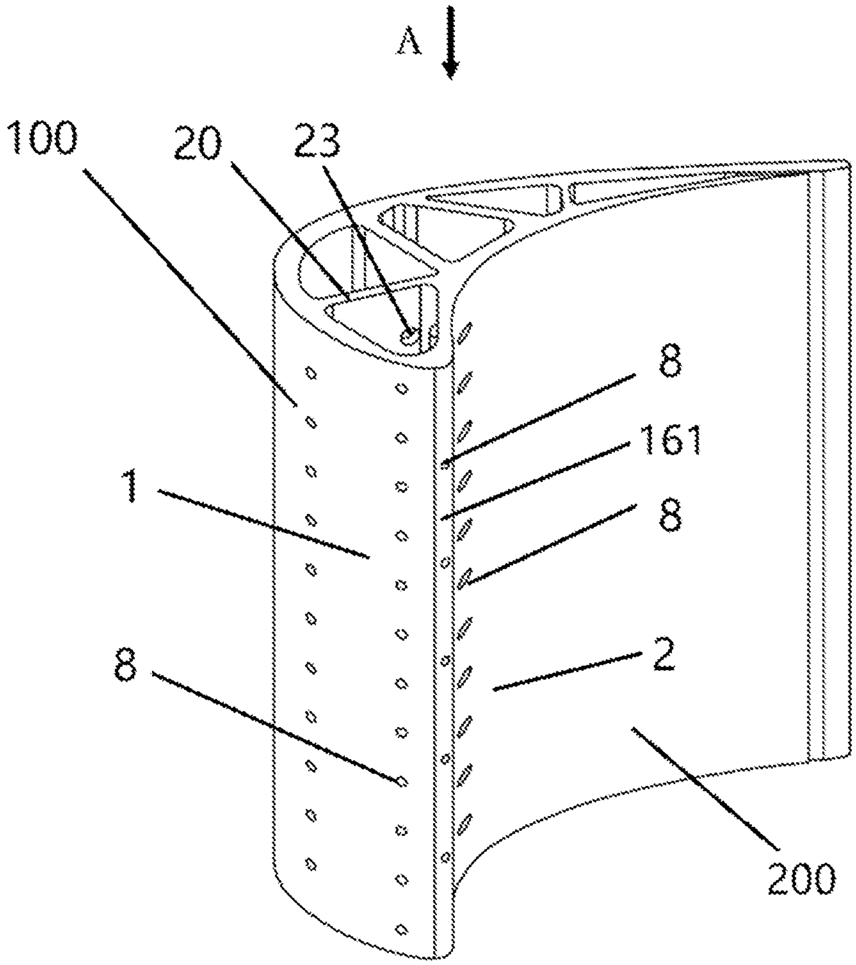
FIG. 1 is a perspective view of a turbine blade according to Embodiment 1 of the present disclosure.
Figure 2:
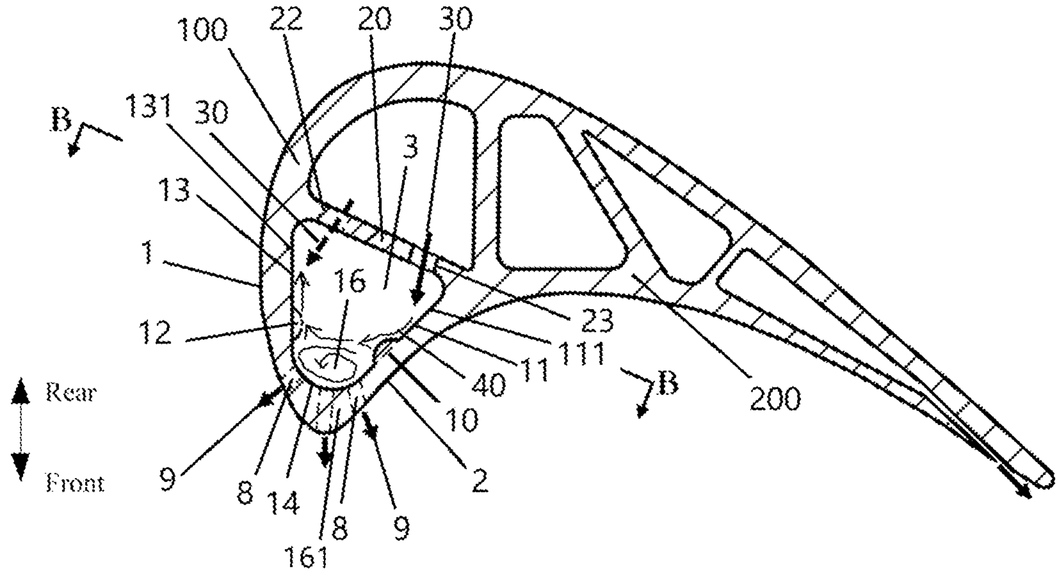
FIG. 2 schematically shows the turbine blade along direction "A" in FIG. 1.
Figure 3:
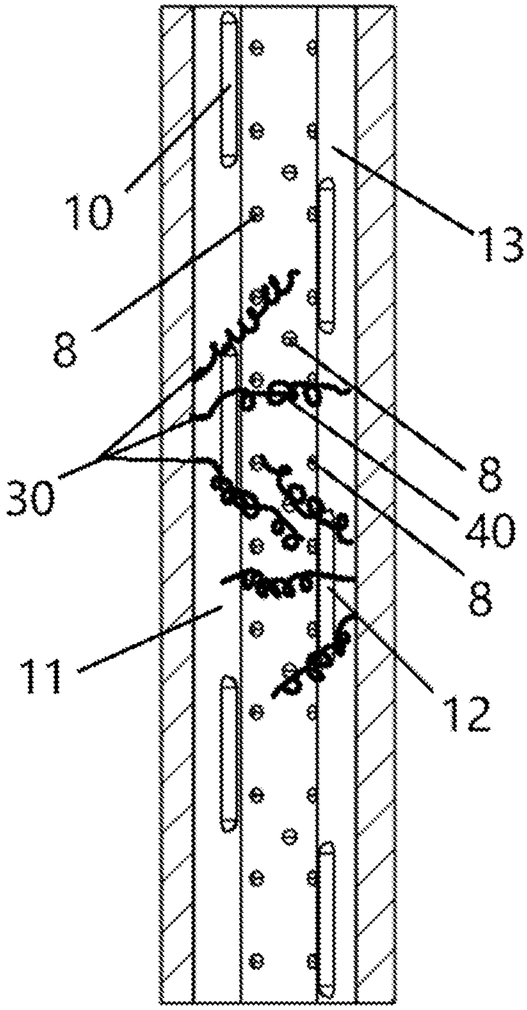
FIG. 3 is a sectional view of the turbine blade along a line B-B in FIG. 2.

As shown in FIGS. 1-3, a turbine blade with enhanced flow characteristics of cooling jet is provided, which includes a blade body, a division plate 20, a plurality of first film cooling holes 8, a plurality of first protruding ridges 12, a plurality of second protruding ridges 10, a first jet hole group, and a second jet hole group.

The blade body includes a suction-side wall surface 100 and a pressure-side wall surface 200.

The suction-side wall surface 100 includes a suction-side inner wall surface 13 and a suction-side outer wall surface 1.

The pressure-side wall surface 200 includes a pressure-side inner wall surface 11 and a pressure-side outer wall surface 2.

The division plate 20 is provided at a leading edge of the blade body. The leading edge of the blade body has a cavity 3. The cavity 3 is enclosed by the division plate 20, the suction-side wall surface 100, and the pressure-side wall surface 200. A stagnation region is formed a junction between the suction-side wall surface 100 and the pressure-side wall surface 200. The stagnation region includes a first stagnation sub-region 161 at the leading edge of the blade body and a second stagnation sub-region 16 at a leading edge of the cavity 3.

The suction-side wall surface 100 and the pressure-side wall surface 200 are each provided with a plurality of the first film cooling holes 8 along a height direction of the blade body. The first stagnation sub-region 161 is provided with a plurality of the first film cooling holes 8 arranged along the height direction of the blade body. The first jet hole group and the second jet hole group are provided on division plate 20. The first jet hole group includes a plurality of first jet holes 22 distributed along the height direction of the blade body; and the second jet hole group includes a plurality of second jet holes 23 distributed along the height direction of the blade body.

In this embodiment, the first jet holes 22 and the second jet holes 23 are arranged obliquely or offset. For example, the axis of the first jet hole 22 or the second jet hole 23 is tilted by 0° to 60° relatively to the vertical direction of the division plate 20. For example, the first jet hole 22 or the second jet hole 23 offsets the middle position of the division plate 20 by 0.5 to 5 times of the diameter of the first jet hole 22 or the second jet hole 23. The jet flows from the first jet holes 22 and/or the second jet holes 23 arranged obliquely or offset, forming an inclined or offset jet.

In this embodiment, both the first jet holes 22 and the second jet holes 23 are not arranged in the middle position of the division plate 20. In an embodiment, the first protruding ridge 12 and the second protruding ridge 10 may also be a rib, and the protrusion of the rib is a rounded structure.

As shown in FIGS. 2 and 3, a plurality of the first protruding ridges 12 are provided on the suction-side inner wall surface 13 along the height direction of the blade body, and a plurality of the second protruding ridges 10 are provided on the pressure-side inner wall surface 11 along the height direction of the blade body. The plurality of the first protruding ridges 12 and the plurality of the second protruding ridges 10 are located on an inner wall surface of the cavity 3.

The plurality of the first protruding ridges 12 divide the suction-side inner wall surface 13 in the cavity 3 into two parts. Specifically, the suction-side inner wall surface 13 in the cavity 3 is divided into a first inner wall surface of the stagnation region and a rear portion 131 of the suction-side inner wall surface 13. The plurality of the second protruding ridges 10 divide the pressure-side inner wall surface 11 in the cavity 3 into two parts. Specifically, the pressure-side inner wall surface 11 in the cavity 3 is divided into a second inner wall surface of the stagnation region and a rear portion 111 of the pressure-side inner wall surface 11. The first inner wall of the stagnation region and the second inner wall of the stagnation region form an inner wall surface 14 of the first stagnation sub-region. Preferably, the plurality of first protruding ridges 12 are disposed on the inner wall surface of the leading edge near the first jet holes 22. In other words, the first protruding ridges 12 are disposed on the suction-side inner wall surface 13. The plurality of second protruding ridges 10 are disposed on the inner wall surface of the leading edge near the second jet holes 23. In other words, the second protruding ridges 10 are disposed on the pressure-side inner wall surface 11. The first protruding ridges 12 and the second protruding ridges 10 are located on both sides of the second stagnation sub-region 16, respectively, that is, the first protruding ridges 12 and the second protruding ridges 10 are located on the left and right sides of the first film cooling holes 8 on the first stagnation sub-region 161, respectively.

A plurality of the first jet holes 22 are arranged spaced apart, a plurality of the second jet holes 23 are arranged spaced apart, and a plurality of the first jet holes 22 and a plurality of the second jet holes 23 are in a staggered arrangement. In the staggered arrangement, a plurality of the first jet holes 22 and a plurality of the second jet holes 23 are arranged at different heights. In an embodiment, the axis of each of the first jet holes 22 is oriented towards the rear portion 131 of the suction-side inner wall surface 13, and the axis of each of the second jet holes 23 is oriented towards the rear portion 111 of the pressure-side inner wall surface 11.

The second stagnation sub-region 16 has an internal concave structure, and the plurality of first protruding ridges 12 and the plurality of second protruding ridges 10 are arranged outside the internal concave structure, specifically, the left and right sides. The first protruding ridges 12 are arranged spaced apart, the second protruding ridges 10 are arranged spaced apart, and the plurality of the first protruding ridges 12 and the plurality of the second protruding ridges 10 are in a staggered arrangement. For example, the plurality of first protruding ridges 12 and the plurality of second protruding ridges 10 are arranged at different heights. In an embodiment, the width of each of the plurality of first protruding ridges 12 and the width of each of the plurality of second protruding ridges 10 are 1.0 to 6.0 times the width of each of the plurality of first jet holes 22. The height of each of the plurality of first protruding ridges 12 and the height of each of the plurality of second protruding ridges 10 are 0.1 to 3.0 times the height of each of the plurality of first jet holes 22.

Along the height direction of the blade body, the plurality of second protruding ridges 10 are provided on a cross section provided with the plurality of second jet holes 23, and the plurality of first protruding ridges 12 and the plurality of first jet holes 22 are not provided on the cross section provided with the plurality of second jet holes 23. Along the height direction of the blade body, the plurality of first protruding ridges 12 are provided on a cross section provided with the plurality of first jet holes 22, and the plurality of second protruding ridges 10 and the plurality of second jet holes 23 are provided on the cross section provided with the plurality of first jet holes 22.

The working principle of the present disclosure is as follows. An inclined or offset cooling jet impacts the curved wall of the leading edge, forming a large tangential flow velocity near the wall, and producing a swirling flow inside the leading edge, thereby performing efficient swirl cooling on the inner wall surface. Swirl cooling has a more uniform heat transfer distribution than current impingement cooling, and a larger area of high heat transfer, thereby obtaining better internal cooling performance of the leading edge than impingement cooling.

Referring to FIG. 2, take for example, an inclined cooling jet is jetted into the cavity 3 of the leading edge from the inclined or offset second jet holes 23 at a certain height. When the inclined or offset jet impacts the curved inner wall of the leading edge, specifically, impacts the rear portion 111 of the pressure-side inner wall surface 11 to produce a high-speed jet on the wall; and the high-speed jet on the wall impacts to the wall of the second protruding ridges 10. A partial high-speed jet 30 skims over the second protruding ridge 10 at high speed, attaches or impacts to the rear portion 131 of the suction-side inner wall surface 13, and does not attach or impact to the first protruding ridge 12. In addition, other high-speed jet flows into the second stagnation sub-region 16 in the cavity 3, and finally flows out of the first film cooling holes 8, forming the film outflow 9. Since the second stagnation sub-region 16 in the cavity 3 has concave structure, a low-speed reflux area will be produced in the second stagnation sub-region 16. This low-speed flow area is conducive to the inlet air flow of the first film cooling holes 8 on the first stagnation sub-region 161 of the leading edge, thereby forming a more uniform flow in the first film cooling holes 8 and avoiding the local high flow rate in the film holes. Thus, the low-speed flow area is conducive to the formation of the film flow with a low blowing ratio at the exit of the first film cooling holes 8, thereby forming efficient film cooling on the outer wall. Moreover, the flow cooling performance in the first film cooling holes 8 on the suction-side wall surface 100 and the pressure-side wall surface 200 is also higher.

Further, the high-speed jet attaching or impacting to the rear portion 131 of the suction-side inner wall surface 13 continues to move along the inner wall of the cavity 3 of the leading edge, and impacts the wall of the second protruding ridges 10 again, then is divided into two parts. Among, one part of the high-speed jet skims over the second protruding ridges 10, and the other part flows into the second stagnation sub-region 16 in the cavity 3. The high-speed jet skimming over the second protruding ridges 10 continues to move along the cavity 3 of the leading edge, impacts the wall of the second protruding ridges 10 again, and performs a repeating movement.

The one-sided jet is tilted or offset on the upstream wall of the second protruding ridges 10, that is, the rear portion 111 of the pressure-side inner wall surface 11 and the rear portion 131 of the suction-side inner wall surface 13 to produce swirl cooling, which produces strong heat transfer and cooling performance on the rear portion 111 of the pressure-side inner wall surface 11. But the heat transmission on the rear portion 131 of the suction-side inner wall surface 13 is lower than that of the rear portion 111 of the pressure-side inner wall surface 11.

In order to obtain a more uniform cooling performance on the leading edge of the blade body, the jet holes are alternately arranged at different heights in the division plate 20 near the pressure-side inner wall surface 11 and the suction-side inner wall surface 13, that is, a plurality of the first jet holes 22 and a plurality of the second jet holes 23 in the division plate 20 are distributed along the height direction of the blade body. A plurality of the first jet holes 22 are arranged spaced apart, a plurality of the second jet holes 23 are arranged spaced apart, and the first jet holes 22 and the second jet holes 23 are in a staggered arrangement. Such an arrangement creates alternating double swirl cooling inside the leading edge of the turbine blades, which can improve the flow conditions of film cooling orifices and film cooling holes and improve the external film cooling performance.

In an embodiment, the first jet hole 22 and the second jet hole 23 are equal in diameter. The length of the first protruding ridge 12 is equal to that of the second protruding ridge 10; and the width of the first protruding ridge 12 is equal to that of the second protruding ridge 10.

In this embodiment, the axis of the second jet hole is designed to be oriented towards the rear portion of the pressure-side inner wall surface, so that the swirling flow generated on the rear portion of the pressure-side inner wall surface can attach or impinge on the rear portion of the suction-side inner wall surface (that is, the portion of the suction-side inner wall surface near the division plate), and can flow tangentially against the suction-side inner wall surface, which can enhance the heat transfer of the inner wall of the turbine blade and improve the cooling uniformity of the inner wall.

In this embodiment, the axis of the first jet hole is designed to be oriented towards the rear portion of the suction-side inner wall surface, so that the swirling flow generated on the rear portion of the suction-side inner wall surface can attach or impinge on the rear portion of the pressure-side inner wall surface (that is, the portion of the pressure-side inner wall surface near the division plate), and can flow tangentially against the pressure-side inner wall surface, which can enhance the heat transfer of the inner wall of the turbine blade and improve the cooling uniformity of the inner wall.

In an embodiment, the height of the second jet hole 23 faces towards the center point in the length direction of the second protruding ridge 10. But the corresponding suction-side inner wall surface 13 on the cross-section is not provided with the first protruding ridge 12, and at the height corresponding to the cross-section, the division plate 20 is not arranged with the first jet hole 22. Based this design, after the jet impacts the pressure-side inner wall surface 11, a part of the jet produces a swirling flow; and after the swirling flow attaches or impacts to the suction-side inner wall surface 13 on the other side, the swirling flow will flow tangentially along the suction-side inner wall surface 13, thereby enhancing heat transfer. When the jet 30 impacts the pressure-side inner wall surface 11 and the second protruding ridge 10, the jet will extend along the length direction of the second protruding ridge 10, which not only enhances heat transfer, but also increases the area of high heat transfer, and improves the convection cooling performance of the inner wall of the leading edge. Similarly, when the jet 30 near the suction side impacts the suction-side inner wall surface 13 and the first protruding ridge 12, a large area of high heat transfer area is obtained on the suction-side inner wall surface 13, which improves the convection cooling performance of the inner wall of the leading edge. Similarly, in an embodiment, the height of the first jet hole 22 faces towards the center point in the length direction of the first protruding ridge 12, but the corresponding pressure-side inner wall surface 11 on the cross-section is not arranged with the second protruding ridge 10, and at the height corresponding to the cross-section, the division plate 20 is not arranged with the second jet hole 23.

Embodiment 2

The differences from Embodiment 1 are described as follows.

Figure 4:
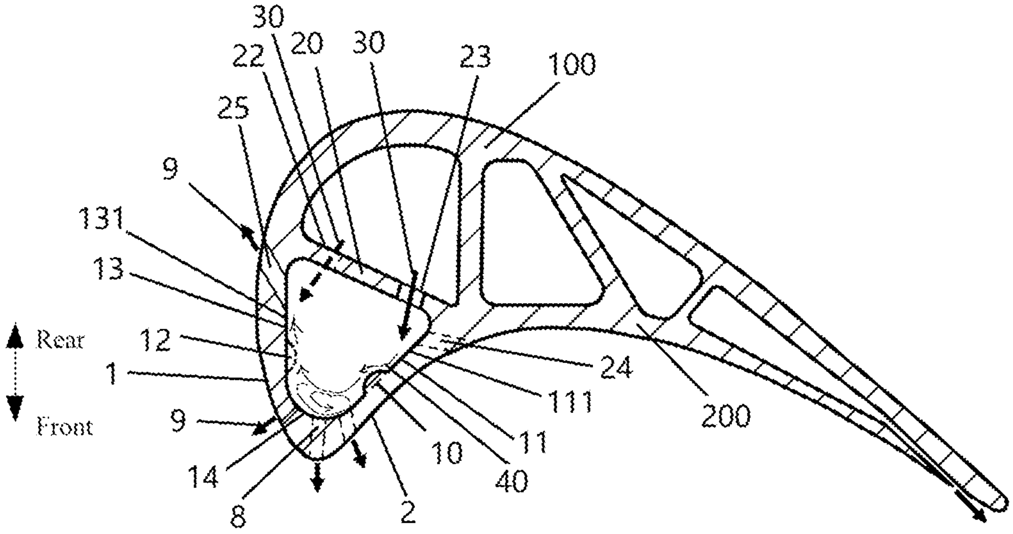
FIG. 4 is a schematic diagram of a turbine blade according to Embodiment 2 of the present disclosure.

As shown in FIG. 4, a plurality of second film cooling holes 24 are provided on the rear portion 111 of the pressure-side inner wall surface 11 along the height direction of the blade body. A plurality of third film cooling holes 25 are provided on the rear portion 131 of the suction-side inner wall surface 13 along the height direction of the blade body. The plurality of second film cooling holes 24 and the plurality of third film cooling holes 25 are arranged alternately in turn. In an embodiment, the height of the second film cooling hole 24 matches with the height of the first jet hole 22, and the third film cooling hole 25 matches the height of the second jet hole 23. The cross-section provided with the second jet hole 23 is provided with the second protruding ridge 10 and the third film cooling hole 25, but not provided with the first protruding ridge 12 and the first jet hole 22. The cross-section provided with the first jet hole 22 is provided with the first protruding ridge 12 and the second film cooling hole 24, but not provided with the second protruding ridge 10 and the second jet hole 23.

In an embodiment, the distance between two adjacent first jet holes 22 is 2 to 6 times diameter of the first jet hole 22. The distance between two adjacent second jet holes 23 is 2 to 6 times the diameter of the second jet hole 23. The width of the first protruding ridge 12 and the second protruding ridge 10 is 1.0 to 3.0 times the width of the first jet hole 22. The width and height of the first protruding ridge 12 and the second protruding ridge 10 are conducive to enlarge the scope of jet attachment and improve the internal swirl cooling performance.

Take for example, an inclined cooling jet is jetted into the cavity 3 of the leading edge from the inclined or offset second jet holes 23 at a certain height. After the jet 30 acts on the wall of the second protruding ridge 10, a part of the jet forms a swirling flow 40, attaches to the rear portion 131 of the suction-side inner wall surface 13, and flows tangentially along the suction-side inner wall surface 13. The tangential flow direction is adapted to the inclination direction of the third film cooling hole 25, and the jet is ejected from the third film cooling hole 25, so that a better flow state can be produced in the third film cooling hole 25 of the suction-side inner wall surface, which is conducive to the enhancement of film cooling performance on the suction-side outer wall surface 1. The other part of the jet has the similar flow state to embodiment 1. Similarly, when the jet flow 30 is injected from the first jet hole 22, the jet flow 30 acts on the suction-side inner wall surface 13 and the first protruding ridge 12. A part of the jet produces a swirling flow, which adheres to the pressure-side inner wall surface 11, and flows tangentially along the pressure-side inner wall surface 11. The tangential flow direction is adapted to the inclination direction of the second film cooling hole 24, and the jet flow is ejected from the second film cooling hole 24 so that a better flow state can be produced in the second film cooling hole 24, which is conducive to the enhancement of film cooling on the pressure-side outer wall surface 2. The flow state of the other part of the jet flow will not be repeated herein. In an embodiment, the inclination angle of the first film cooling hole 8, the second film cooling hole 24, the third film cooling hole 25 is 0~90° relative to the normal direction of the respective surface thereof.

In the height direction, the low-speed flow field in the second stagnation sub-region 16 at a certain height is referred to as the first low-speed flow field. The low-speed flow field in the second stagnation sub-region 16 in the adjacent height is referred to as the second low-speed flow field. The first low-speed flow field and the second low-speed flow field will collide and mix in the height direction of the cavity 3 to form a low-speed vortex, which is conducive to improving the inlet flow of the first film cooling hole 8 and improving the cooling performance of the outer wall of the film holes.

In this embodiment, the axis of the first jet hole 22 is oriented towards the rear portion 131 of the suction-side inner wall surface 13; the axis of the second jet hole 23 is oriented towards the rear portion 111 of the pressure-side inner wall surface 11; the first protruding ridges 12 and the second protruding ridges 10 are in a staggered arrangement; the first jet holes 22 and the second jet holes 23 are in a staggered arrangement; and the second film cooling hole 24 and the third film cooling hole 25 are provided. The cross-section provided with the second jet hole 23 is provided with the second protruding ridge 10 and the third film cooling hole 25, but not provided with the first protruding ridge 12 and the first jet hole 22. This arrangement is conducive to obtaining better internal wall heat transfer performance and better heat transfer uniformity, and smaller flow pressure loss on the pressure-side inner wall surface and the suction-side inner wall surface. This arrangement also improves the internal flow cooling performance and the corresponding air film cooling performance of the first film cooling hole 8 in the first stagnation sub-region 161, the first film cooling hole 8 provided on the suction-side wall surface 100 and the pressure-side wall surface 200, and the second film cooling hole 24 and the third film cooling hole 25.

In an embodiment, the protrusion of the first protruding ridge 12 and the protrusion of the second protruding ridge 10 are rounded structure, and the height of the first protruding ridge 12 and the height of the second protruding ridge 10 are small, which can reduce the flow separation after the swirling flow skims the first protruding ridge 12 or the second protruding ridge 10. The protruding ridge also increases the heat transfer/cooling area of the inner wall of the leading edge. The dense distribution of film cooling holes on the leading-edge wall surface brings large heat transfer area in the film cooling holes. The flow cooling in the holes is one of the main means of cooling the leading edge wall surface, and improving the flow in the film cooling holes is will facilitate improving the convective cooling in the film cooling holes and the external film cooling performance.

The present disclosure further provides an engine using the above-mentioned turbine blade that improves swirling cooling capability of the leading edge.

Regarding the turbine blade provided herein, the oblique or offset jet is employed to form swirling flow and swirl cooling in the leading-edge inner cavity. Further, in combination of the arrangement of protruding ridges, the flow at the entrance of the film cooling holes is improved, an improved velocity distribution in the film cooling holes is reached, thereby realizing the better flow cooling effect inside the film cooling holes and improving the cooling capability outside the film cooling holes.

The swirling flow on both sides and the arrangement of protruding ridges on the inner wall in the disclosure are used to improve the cooling performance of the inner wall of the leading edge of the turbine blade, and the film cooling performance. The cooling structure of the leading edge improves the inlet flow of film holes on the inner wall surface of the first stagnation sub-region in the leading edge by eliminating high-speed crossflow and jet impact stagnation on the inlet wall of the film hole.

As used herein, it should be understood that the orientation or positional relationship indicated by the terms "upper", "lower", "front", "rear", "left", "right", "vertical", "horizontal", "top", "bottom", "inside", and "outside", etc. is based on the orientation or positional relationship shown in the accompanying drawings, which is only for the convenience of describing the technical solutions and simplifying the description, rather than indicating or implying that the indicated device or element must have a specific orientation, be constructed or operated in a specific orientation. Therefore, these terms should not be understood as a limitation of the present disclosure.

Described above are merely some embodiments of the disclosure, which are not intended to limit the disclosure. It should be understood that any modifications and replacements made by those skilled in the art without departing from the spirit of the disclosure should fall within the scope of the disclosure defined by the present claims. It should be noted that embodiments of the present disclosure and the features therein may be combined with each other in the case of no contradiction.

What is claimed is:

1. A turbine blade, comprising:

a blade body;

a division plate;

a plurality of first protruding ridges;

a plurality of second protruding ridges;

a first jet hole group; and a second jet hole group;

wherein the blade body comprises a suction-side wall surface and a pressure-side wall surface;

the suction-side wall surface comprises a suction-side inner wall surface and a suction-side outer wall surface;

the pressure-side wall surface comprises a pressure-side inner wall surface and a pressure-side outer wall surface;

the division plate is provided at a leading edge of the blade body; the leading edge of the blade body has a cavity enclosed by the division plate, the suction-side wall surface, and the pressure-side wall surface; a stagnation region is formed by a junction between the suction-side wall surface and the pressure-side wall surface; and the stagnation region comprises a first stagnation sub-region at the leading edge of the blade body and a second stagnation sub-region at the leading edge of the cavity;

the suction-side wall surface, the pressure-side wall surface, and the first stagnation sub-region are each provided with a plurality of first film cooling holes along a height direction of the blade body; the first jet hole group and the second jet hole group are provided on the division plate; the first jet hole group comprises a plurality of first jet holes distributed along the height direction of the blade body; and the second jet hole group comprises a plurality of second jet holes distributed along the height direction of the blade body;

the plurality of first protruding ridges are provided on the suction-side inner wall surface along the height direction of the blade body; the plurality of second protruding ridges are provided on the pressure-side inner wall surface along the height direction of the blade body; and the plurality of first protruding ridges and the plurality of second protruding ridges are located on an inner wall surface of the cavity;

the suction-side inner wall surface in the cavity is divided by the plurality of first protruding ridges into a first inner wall surface of the stagnation region and a rear portion of the suction-side inner wall surface; and the pressure-side inner wall surface in the cavity is divided by the plurality of second protruding ridges into a second inner wall surface of the stagnation region and a rear portion of the pressure-side inner wall surface; and the first inner wall surface of the stagnation region and the second inner wall surface of the stagnation region form an inner wall surface of the first stagnation sub-region.

2. The turbine blade of claim 1, wherein the plurality of first protruding ridges are arranged spaced apart; the plurality of second protruding ridges are arranged spaced apart; and the plurality of first protruding ridges and the plurality of second protruding ridges are in a staggered arrangement.

3. The turbine blade of claim 1, wherein the second stagnation sub-region has an internal concave structure; and the plurality of first protruding ridges and the plurality of second protruding ridges are arranged outside the internal concave structure.

4. The turbine blade of claim 1, wherein an axis of each of the plurality of first jet holes is configured to be oriented towards the rear portion of the suction-side inner wall surface; and an axis of each of the plurality of second jet holes is configured to be oriented towards the rear portion of the pressure-side inner wall surface.

5. The turbine blade of claim 1, wherein the plurality of first jet holes are arranged spaced apart; the plurality of second jet holes are arranged spaced apart; and the plurality of first jet holes and the plurality of second jet holes are in a staggered arrangement.

6. The turbine blade of claim 1, wherein a width of each of the plurality of first protruding ridges and a width of each of the plurality of second protruding ridges are 1.0 to 6.0 times a width of each of the plurality of first jet holes; and a height of each of the plurality of first protruding ridges and a height of each of the plurality of second protruding ridges are 0.1 to 3.0 times a height of each of the plurality of first jet holes.

7. The turbine blade of claim 1, wherein along the height direction of the blade body, the plurality of second protruding ridges are provided on a cross section provided with the plurality of second jet holes; and the plurality of first protruding ridges and the plurality of first jet holes are not provided on the cross section provided with the plurality of second jet holes; and along the height direction of the blade body, the plurality of first protruding ridges are provided on a cross section provided with the plurality of first jet holes; and the plurality of second protruding ridges and the plurality of second jet holes are provided on the cross section provided with the plurality of first jet holes.

8. The turbine blade of claim 1, wherein a plurality of second film cooling holes are provided on the rear portion of the pressure-side inner wall surface along the height direction of the blade body; a plurality of third film cooling holes are provided on the rear portion of the suction-side inner wall surface along the height direction of the blade body; and the plurality of second film cooling holes and the plurality of third film cooling holes are arranged alternately.

9. The turbine blade of claim 8, wherein a distance between two adjacent first jet holes of the plurality of first jet holes is 2 to 6 times a diameter of each of the plurality of first jet holes; and a distance between two adjacent second jet holes of the plurality of second jet holes is 2 to 6 times a diameter of each of the plurality of second jet holes.

10. An engine, comprising:

the turbine blade of claim 1.

* * * * *